(12) United States Patent
Kim et al.

(10) Patent No.: US 7,283,104 B2
(45) Date of Patent: Oct. 16, 2007

(54) PIP PROCESSING SYSTEM AND A METHOD OF CONTROLLING THE SAME

(75) Inventors: Yong-jae Kim, Suwon (KR); Jong-jin Yi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 821 days.

(21) Appl. No.: 10/323,723

(22) Filed: Dec. 20, 2002

(65) Prior Publication Data

US 2003/0208751 A1  Nov. 6, 2003

(30) Foreign Application Priority Data

May 3, 2002  (KR) .............................. 2002-24410

(51) Int. Cl.
G09G 5/00 (2006.01)
(52) U.S. Cl. .......................... 345/9; 345/156; 345/163; 345/55
(58) Field of Classification Search ................ 345/9, 345/156, 163, 55
See application file for complete search history.

(56) References Cited

U.S. PATENT DOCUMENTS 6,055,023 A * 4/2000 Rumreich et al. .......... 348/553
6,768,385 B2 * 7/2004 Smith ......................... 331/1 A

FOREIGN PATENT DOCUMENTS

| JP | 1093855 | 4/1989 |
| JP | 10164563 | 6/1998 |
| JP | 11205670 | 7/1999 |

* cited by examiner

*Primary Examiner*—Richard Hjerpe
*Assistant Examiner*—Leonid Shapiro
(74) *Attorney, Agent, or Firm*—Staas & Halsey LLP

(57) ABSTRACT

A PIP processing system and method of a monitor coupled to a computer main body, include a mouse coupled to the computer main body outputting a mouse signal and a mouse input processing part provided in the computer main body coupled to the mouse, converting the mouse signal into a PIP screen control signal to control a PIP function, and transmitting the PIP screen control signal to the monitor. A PIP processing part supports the PIP function displaying a main picture as a full screen and a PIP screen smaller than the main picture. A micro controller controls the PIP processing part based on the PIP screen control signal transmitted from the mouse input processing part, and adjusts a size or a position of the PIP screen.

20 Claims, 6 Drawing Sheets

PIP PROCESSING SYSTEM AND A METHOD OF CONTROLLING THE SAME

CROSS-REFERENCE TO RELATED APPLICATIONS

This application claims the benefit of Korean Application No. 2002-24410, filed May 3, 2002, in the Korean Patent Office, the disclosure of which is incorporated herein by reference.

BACKGROUND OF THE INVENTION

1. Field of the Invention

The present invention relates to a PIP (picture-in-picture) processing system and a method of controlling the same, and more particularly, to a PIP processing system and a method of controlling the same, which can easily and finely adjust using a mouse signal a size and a position of a PIP screen in a computer monitor having a PIP function.

2. Description of the Related Art

A monitor with a PIP function can simultaneously display two different pictures on one screen. According to the PIP function, video signals received from two or more video signal sources are processed, respectively, and a main picture is displayed as a full screen and a PIP picture is displayed with a 1/n size of a background of the main picture. That is, different pictures are displayed on one screen at the same time.

In a monitor having the PIP function, generally, a video signal from a graphic card of a computer main body is displayed on a main screen and a video signal outputted from a TV or a VTR is displayed on a PIP screen, so that a TV picture or a VTR picture is displayed together with a computer picture.

FIG. 6 is a control block diagram of a monitor having the PIP function.

As shown therein, a monitor 130 having the PIP function includes a computer input part 138 receiving a video signal from a computer main body 101 provided with a CPU (central processing unit) 103, an auxiliary input part 140 receiving a video signal from another video signal source, and a PIP processing part 136 PIP-processing video signals received from both input parts 138 and 140. A video processing part 134 converts the video signal outputted from the PIP processing part 136 into a proper signal for display, a display part 132 is provided in the monitor 130 on which a picture according to the PIP function is displayed, and a micro controller 144 controls the monitor 130. The computer input part 138 receives the video signal from a graphic card 105 in the computer main body 101, and the video signal form the auxiliary input part 140 the video signal from another video signal source such as a TV, a VTR, or etc.

The PIP processing part 136 PIP-processes video signals outputted from both input parts 138 and 140 according to a control signal from the micro controller 144, and synthesizes the video signals so as to display different pictures based on the video signals from both input parts 138 and 140 on the display part 132 at the same time. The video processing part 134 processes the video signal outputted from the computer signal input part 138 according to a control signal from the micro controller 144 when the monitor 130 is not set in a PIP mode, thereby displaying a picture based on the video signal outputted from the computer main body 101 on the display part 132.

The PIP function is directly concerned with the monitor 130 independently of the computer main body 101, so that a PIP screen adjuster 146 to adjust the PIP screen is provided in the monitor 130. Thus, through the PIP screen adjuster 146, a user can adjust a size and a position of the PIP screen displayed in the PIP mode, and the micro controller 144 controls the PIP processing part 136 according to the adjustment of a user, thereby adjusting the size, the position, etc. of the PIP screen. A key button provided outside the monitor 130 or an OSD (on screen display) menu may be employed as the PIP screen adjuster 146.

In a case where the key button is employed as the PIP screen adjuster, the user toggles the key button while watching the PIP screen displayed on the display part 132, thereby changing the position of the PIP screen at predetermined intervals or the size of the PIP screen by ½ times, ⅔ times, etc. However, the key button cannot be used to easily adjust the size and the position of the PIP screen because the key button must be successively toggled, and a fine adjustment is impossible because the position and the size of the PIP screen are changed at predetermined intervals and at predetermined times, respectively.

Further, in a case where the OSD menu is employed as the PIP screen adjuster, the user selects one among preset positions or among preset sizes of the PIP screen through the OSD menu, thereby changing the position or the size of the PIP screen by a preset position or a preset size.

As described above, the conventional PIP screen adjuster cannot easily adjust the PIP screen, and is inconvenient for a fine adjustment of the PIP screen in the position, the size, etc.

SUMMARY OF THE INVENTION

Various objects and advantages of the invention will be set forth in part in the description that follows and, in part, will be obvious from the description, or may be learned by practice of the invention.

Accordingly, it is an object of the present invention to provide a PIP processing system and a method of controlling the same, which can easily and finely adjust a size and a position of a PIP screen.

The foregoing and other objects of the present invention are achieved by providing a PIP processing system of a monitor coupled to a computer main body, including: a mouse coupled to the computer main body outputting a mouse signal; a mouse input processing part provided in the computer main body coupled to the mouse, converting the mouse signal into a PIP screen control signal to control a PIP function, and transmitting the PIP screen control signal to the monitor; a PIP processing part supporting the PIP function displaying a main picture as a full screen and a PIP screen smaller than the main picture; and a micro controller controlling the PIP processing part based on the PIP screen control signal transmitted from the mouse input processing part, and adjusting at least one of a size and a position of the PIP screen.

To achieve the above and other objects according to an embodiment of the present invention, a PIP processing system further includes a data interface in the monitor providing data communication between the computer main body and the monitor, wherein the micro controller transmits PIP screen data including the at least one of the size and the position of the PIP screen displayed on the monitor, to the computer main body through the data interface, and a PIP screen controller in the computer main body transmitting frame data to visually limit a display area of the PIP screen against the main screen on the monitor based on the PIP screen data.

To achieve the above and other objects according to an embodiment of the present invention, a PIP processing system of a monitor is coupled to a computer main body and includes: a device coupled to the computer main body outputting an input signal; an input processing part in the computer main body converting the input signal into a PIP screen control signal and transmitting the PIP screen control signal to the monitor; a micro controller transmitting to the computer main body PIP screen data including at least one of a size and a position of a PIP screen to be displayed on the monitor; and a PIP screen controller in the computer main body transmitting frame data to the monitor to visually limit a display area of the PIP screen against a main screen on the monitor based on the PIP screen data.

According to another aspect of the present invention, the above and other objects may be also achieved by providing a method of controlling a PIP processing system of a monitor receiving video signals from a computer main body and another video signal source and displaying a main picture as a full screen and a PIP screen smaller than the main picture, including: determining whether a mouse signal from a mouse coupled to the computer main body is inputted to adjust a PIP screen; converting the mouse signal into a PIP screen control signal when the mouse signal is inputted to adjust the PIP screen; and adjusting at least one of a size and a position of the PIP screen based on the PIP screen control signal.

According to another aspect of the present invention, the above and other objects may be also achieved by providing a method of controlling PIP processing system of a monitor coupled to a computer main body, including: generating an input signal from a device coupled to the computer main body; converting the input signal into a PIP screen control signal; transmitting to the computer main body PIP screen data including at least one of a size and a position of a PIP screen to be displayed on the monitor; transmitting frame data to the monitor to visually limit a display area of the PIP screen against a main screen on the monitor based on the PIP screen data; and adjusting at least one of the position and the size of the PIP screen on the basis of the PIP screen control signal.

To achieve the above and other objects according to an embodiment of the present invention, the method further provides transmitting PIP screen data including at least one of size data and position data of the PIP screen from the monitor to the computer main body; and adding a frame visually limiting a display area of the PIP screen against the main screen to the monitor based on the PIP screen data transmitted to the computer main body.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
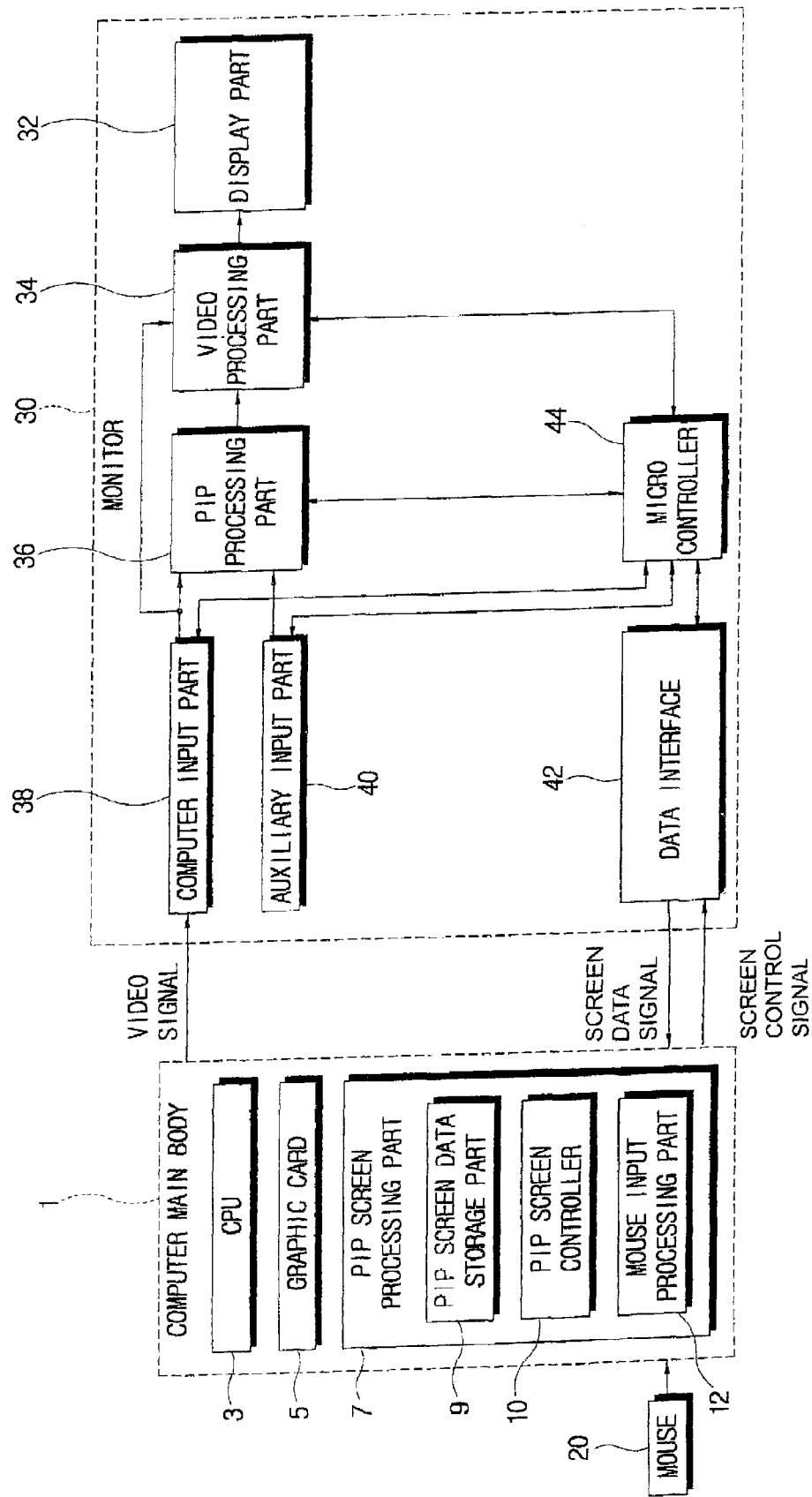
FIG. 1 is a control block diagram of a PIP processing system of a monitor according to an embodiment of the present invention.

FIG. 1 is a control block diagram of a PIP processing system of a monitor according to the present invention. As shown therein, the PIP processing system according to the present invention includes a mouse 20 or similar device to adjust a PIP screen. A computer main body 1 is provided with a PIP screen processing part 7 which converts a mouse signal from the mouse 20 into a PIP screen control signal to be transmitted to a monitor 30 and processes PIP screen data transmitted from the monitor 30. The monitor 30 coupled to the computer main body 1 processes a video signal outputted from a computer input part 38 and an auxiliary input part 40 so as to perform a PIP function, transmits the PIP screen data to the computer main body 1, and controls the PIP function on the basis of the PIP screen control signal outputted from the computer main body 1.

The computer main body 1 includes a CPU (central processing unit) 3, a graphic card 5 generating a video signal, and the PIP screen processing part 7 converting the mouse signal from the mouse 20 into the PIP screen control signal. The graphic card 5 transmits R/G/B (red, green, blue) signals and H/V_sync (horizontal and vertical synchronous) signals from the computer main body 1 to the monitor 30, thereby allowing data processed by the computer main body 1 to be displayed on a display part 32 of the monitor 30.

The PIP screen processing part 7 includes a PIP screen data storage part 9 in which data is stored including a position and a size of the PIP screen included in the PIP screen data transmitted from the monitor 30 and frame data of the PIP screen. A mouse input processing part 12 converts the mouse signal from the mouse 20 into the PIP screen control signal. A PIP screen controller 10 transmits the PIP screen control signal processed by the mouse input processing part 12 to a data interface 42 of the monitor 30 and processes the PIP screen data transmitted from the monitor 30.

Herein, the PIP screen controller 10 recognizes the position and the size of the PIP screen on the basis of the PIP screen data, and controls a frame to be displayed to visually limit a display area of the PIP screen displayed on the display part 32 of the monitor 30. Further, the PIP screen controller 10 controls the mouse input processing part 12 to convert the mouse signal from the mouse 20 into the PIP screen control signal to adjust the PIP screen data transmitted to the monitor 30.

On the other hand, the monitor 30 includes the computer input part 38 receiving the video signal from the graphic card 5, the auxiliary input part 40 receiving a video signal from another video signal source (not shown), the data interface 42 to perform data communication with the computer main body 1, the PIP processing part 36 PIP-processing the video signals received from both input parts 38 and 40, a video processing part 34 converting the video signal outputted from the PIP processing part 36 into a proper signal to display, the display part 32 on which a picture according to the PIP function is displayed. A micro controller 44 in the monitor 30 controls the computer input part 38, the data interface 42, the auxiliary input part 40, the PIP processing part 36, the video processing part 34, and the display part 32.

The computer input part 38 receives the video signal from the graphic card 5, and the auxiliary input part 40 receives the video signal from another video signal source. Herein, the auxiliary input part 40 may be a connector to be electrically coupled to a TV, a VTR, a DVD player, etc., and may be mounted with a video signal receiver such as a TV tuner receiving a TV signal, etc.

The data interface 42 is employed for data communication between the computer main body 1 and the monitor 30, and may be a USB (universal serial bus) interface, a DDC (display data channel), a UART (universal asynchronous receiver/transmitter) serial interface, etc.

The micro controller 44 controls the PIP processing part 36 and the video processing part 34 to process the video signals outputted from the auxiliary input part 40 and the computer input part 38, respectively, thereby performing the PIP function. Further, under a PIP mode, the micro controller 44 transmits the PIP screen data to the computer main body 1 through the data interface 42, and controls the PIP processing part 36 on the basis of the PIP screen control signal outputted from the computer main body 1, thereby adjusting the PIP screen.

With this configuration, when a user adjusts the size and the position of the PIP screen by using the mouse 20, the mouse signal from the mouse 20 is converted into the PIP screen control signal by the mouse input processing part 12, and the PIP screen control signal is transmitted to the data interface 42 by the PIP screen controller 10. Then, the micro controller 44 in the monitor 30 receives the PIP screen control signal through the data interface 42, and controls the PIP processing part 36, thereby changing the position and the size of the PIP screen.

Further, in the monitor 30, under the PIP mode, the micro controller 44 transmits the data including the position, the size, etc. of the PIP screen to the computer main body 1 through the data interface 42. Then, the PIP screen controller 10 recognizes the position, the size, etc. of the PIP screen on the basis of the PIP screen data transmitted from the monitor 30. Herein, the PIP screen controller 10 can display the frame visually limiting a display area of the PIP screen displayed on the display part 32 of the monitor 30.

Figure 2:
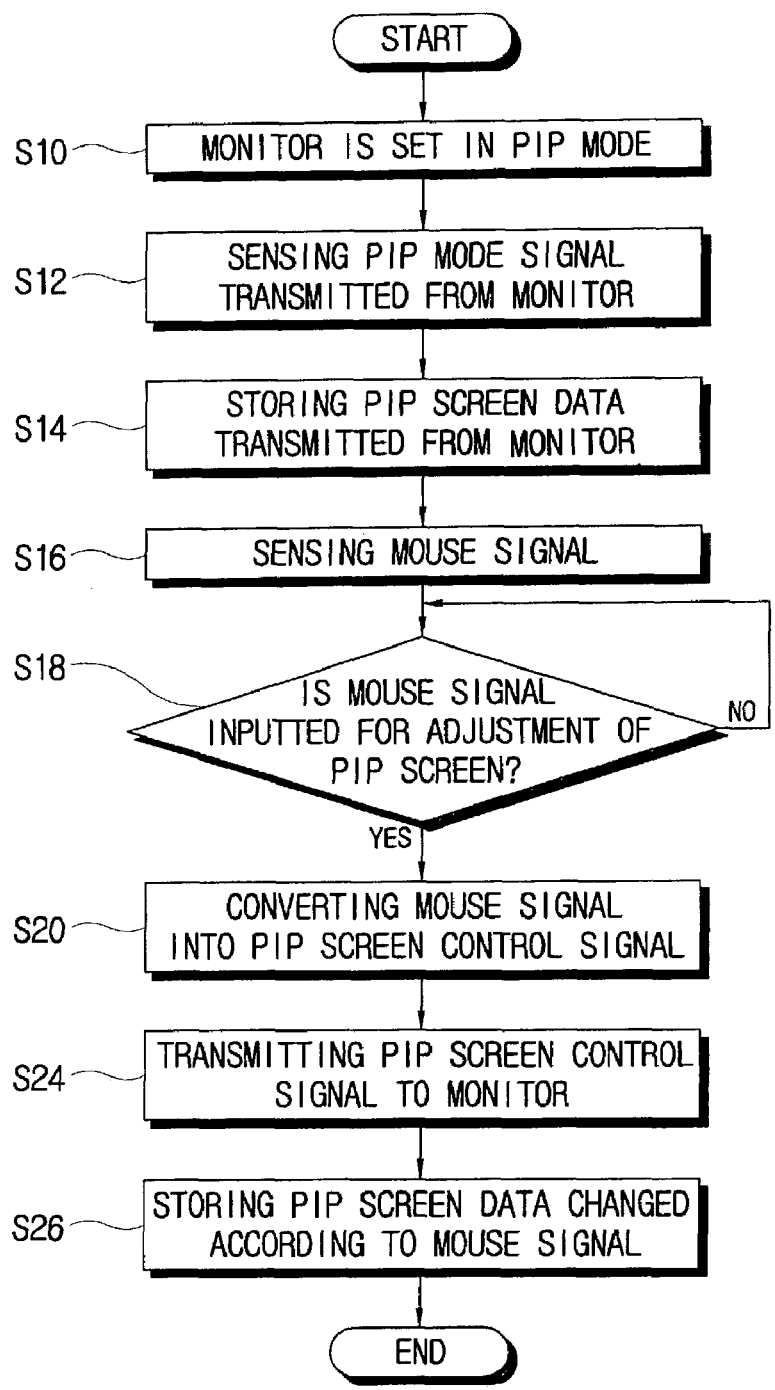
FIG. 2 is a control flow chart of a PIP screen processing part in the PIP processing system of FIG. 1.

With this configuration, the control of the PIP screen processing part 7 will be described below, referring to FIG. 2.

At operation S10, the monitor 30 is set in the PIP mode. At operation S12, the PIP screen controller 10 of the PIP screen processing part 7 senses the PIP mode signal from the monitor 30 and determines that the monitor 30 operates under the PIP mode. When the PIP screen data is transmitted from the monitor 30, at operation S14, the PIP screen controller 10 analyzes the PIP screen data, and stores information on the position, the size, etc. of the PIP screen in the PIP screen data storage part 9. At this time, the PIP screen controller 10 can display the frame on the basis of the PIP screen data stored in the PIP screen data storage part 9, which is added to the PIP screen displayed on the display part 32.

When the mouse signal is generated from the mouse 20 when the user uses the mouse 20, at operation S16, the PIP screen controller 10 senses the mouse signal from the mouse 20, and, at operation S18, determines whether the mouse signal from the mouse 20 is inputted to adjust the PIP screen or not. In the case that the mouse signal is inputted to adjust the PIP screen, at operation S20, the PIP screen controller 10 controls the mouse input processing part 12 to convert the mouse signal into the PIP screen control signal. Thereafter, at operation S24, the PIP screen controller 10 transmits the PIP screen control signal to the monitor 30, and changes the position and the size of the PIP screen on the basis of the PIP screen control signal. After the position and the size of the PIP screen is adjusted, the monitor 30 transmits the adjusted PIP screen data to the PIP screen controller 10, and, at operation S26, the PIP screen controller 10 changes the PIP screen data stored in the PIP screen data storage part 9 for the adjusted PIP screen data transmitted from the monitor 30. At this time, the PIP screen controller 10 can add the frame to the PIP screen displayed on the display part 32 on the basis of the changed PIP screen data, thereby displaying the frame fit to the changed PIP screen.

Figure 3:
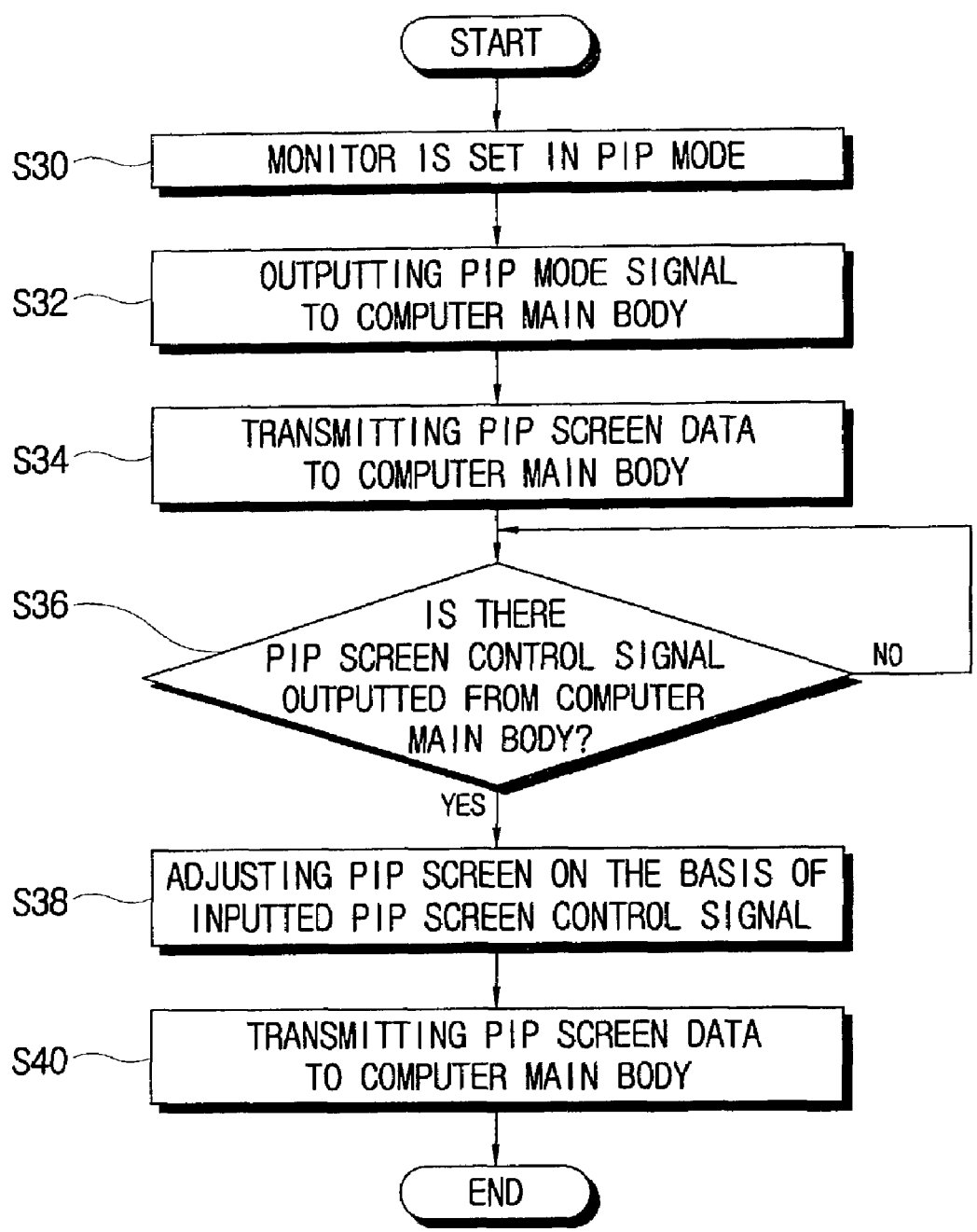
FIG. 3 is a control flow chart of the monitor in the PIP processing system of FIG. 1.

FIG. 3 is a control flow chart of the monitor through the PIP screen processing part 7.

As shown therein, at operation S30, when the monitor 30 is set in the PIP mode, at operation S32, the micro controller 44 in the monitor 30 outputs the PIP mode signal to the computer main body 1, thereby allowing the computer main body 1 to determine that the monitor 30 operates under the PIP mode. Further, at operation S34, the micro controller 44 transmits the PIP screen data, namely, information on the position, the size, etc. of the PIP screen the PIP screen to the computer main body 1.

At operation S36, the micro controller 44 continuously determines whether or not the PIP screen control signal is outputted from the computer main body 1 through the data interface 42. At operation S38, when the PIP screen control signal is outputted from the computer main body 1, the micro controller 44 controls the PIP processing part 36 to change the position and the size of the PIP screen on the basis of the inputted PIP screen control signal. Then, at operation S40, the micro controller 44 transmits the changed PIP screen data to the computer main body 1.

As described above, data is exchanged between the PIP screen processing part 7 provided in the computer main body 1 and the micro controller 44 provided in the monitor 30, so that the PIP screen is adjusted by the mouse signal of the mouse 20, which is employed as an input unit of the computer main body 1.

In the foregoing description, the PIP processing system is accomplished by data communication between the PIP screen processing part 7 provided in the computer main body 1 and the micro controller 44 provided in the monitor 30. Herein, the function of the PIP screen processing part 7 may be accomplished by software such as a Windows application program. In other words, the PIP screen processing part 7 may be a software program performing a specific control.

Therefore, in a case where a monitor and a computer main body are formed as a single body, i.e., in the case where a monitor is not separated from the computer main body, the application program executed in the monitor serves as the PIP screen processing part 7.

Figure 4:
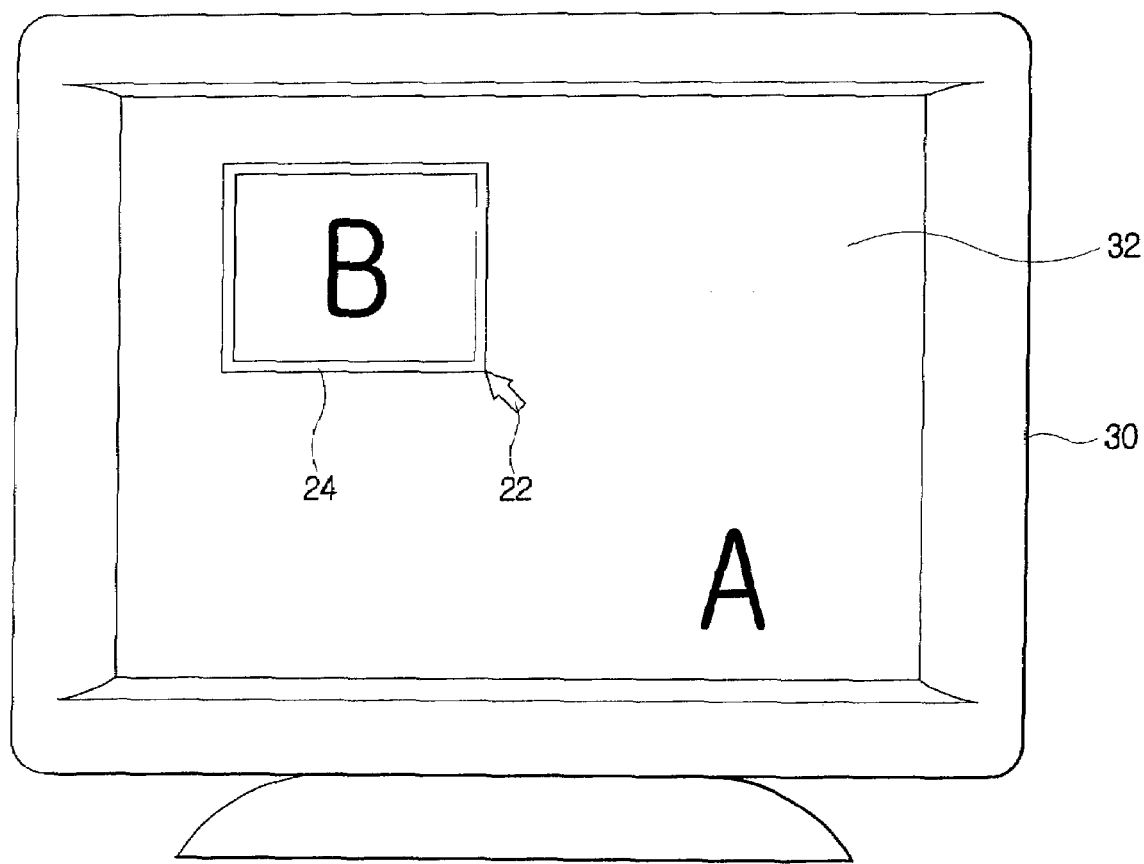
FIGS. 4 and 5 illustrate an adjustment of the PIP screen in the PIP processing system according to an embodiment of the present invention.
Figure 5:
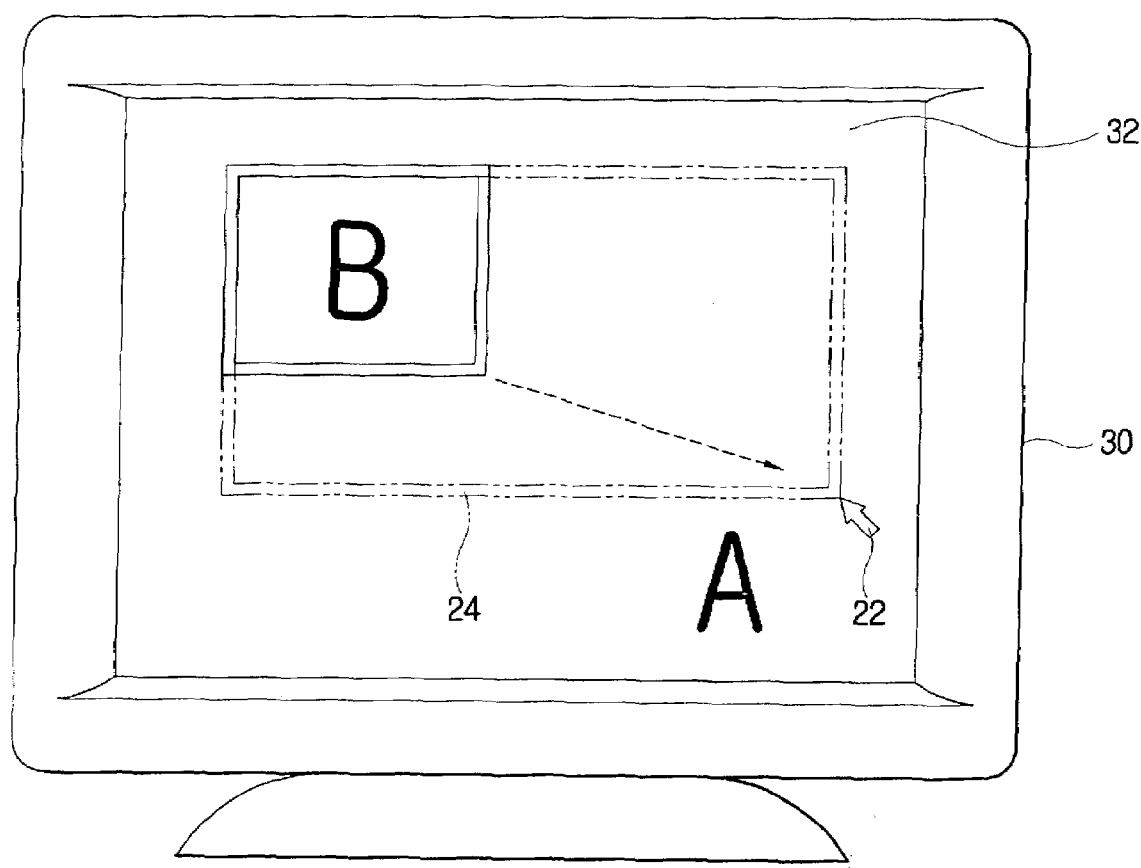
Figure 6:
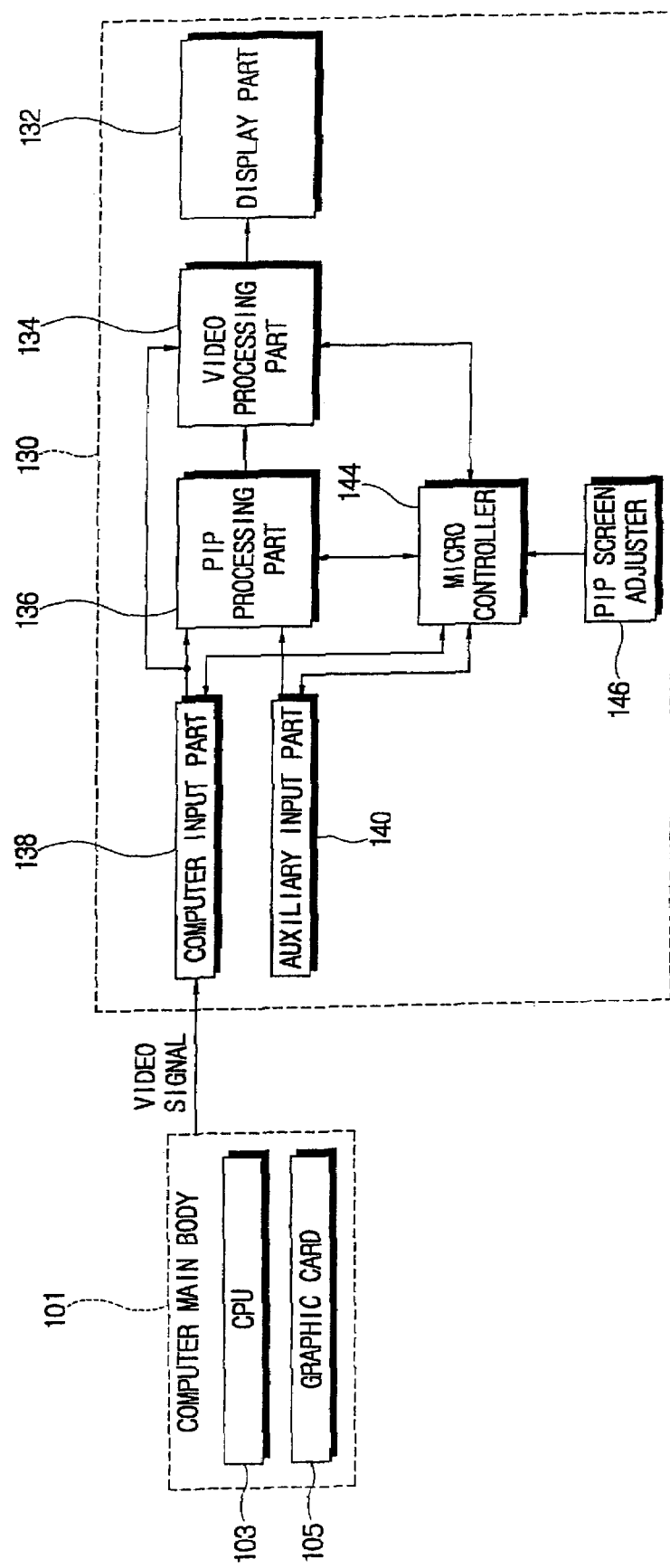
FIG. 6 is a control block diagram of a conventional monitor having a PIP function.

In this PIP processing system, when the user adjusts the size of the PIP screen, the display part 32 displays the screen as illustrated in FIGS. 4 and 5.

When the monitor 30 operates under the PIP mode, the display part 32 displays a main picture "A" as a full screen and a PIP picture "B" as a part of the background of the main picture "A" at the same time. At this time, the PIP picture "B" is surrounded with the frame 24, and therefore the PIP picture is visually distinct from the main picture "A".

When the user wants to adjust a size of the PIP picture "B", the user can drag, as shown in FIG. 5, the frame 24 of the PIP picture "B" by using a mouse cursor 22, thereby increasing or decreasing the size of the display area of the PIP picture "B".

Further, when the user wants to adjust the position of the PIP picture "B", the user can move the PIP picture "B" within the background main picture "A" by using the mouse cursor 22 in the state that a mouse button (not shown) is pressed, thereby changing the position of the PIP picture "B".

As described above, according to the present invention, a computer main body can control a PIP function which is directly associated with a monitor, and therefore a size and a position of a PIP screen can be adjusted by a mouse signal of a mouse. Therefore, the size and the position of the PIP screen can be easily and finely adjust using the mouse.

As described above, the present invention provides a PIP processing system and a method of controlling the same, which can easily and finely adjust a size and a position of a PIP screen.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A PIP processing system of a monitor coupled to a computer main body, comprising:
   a device coupled to the computer main body outputting an input signal;
   an input processing part in the computer main body converting the input signal into a PIP screen control signal and transmitting the PIP screen control signal to the monitor;
   a micro controller in the monitor transmitting to the computer main body PIP screen data comprising at least one of a size and a position of a PIP screen to be displayed on the monitor; and
   a PIP screen controller in the computer main body transmitting frame data to the monitor through an interface in the monitor to visually limit a display area of the PIP screen against a main screen on the monitor based on the PIP screen data,
   wherein the monitor includes a PIP processing part supporting the PIP function displaying a main picture as a full screen and a PIP screen smaller than the main picture, the monitor receiving video signals from the computer main body and video signals received directly at the monitor from a video signal source and outputting the video signals to the PIP processing part.

2. The PIP processing system according to claim 1, wherein the monitor further comprises:
   a computer input part receiving the video signals from the computer main body, and
   an auxiliary input part receiving the video signals from a video signal source, wherein the computer input part and the auxiliary input part output the video signals to the PIP processing part to display the main picture as the full screen and the PIP screen smaller than the main picture.

3. The PIP processing system according to claim 1, wherein the computer main body further comprises:
   a PIP screen data storage part storing the position, the size, and frame data of the PIP screen.

4. The PIP processing system according to claim 1, the monitor further comprising:
   a video processing part converting a video output signal from the PIP processing part into a signal to display the main picture and the PIP screen, and
   a display part on which the main picture as the full screen and the PIP screen smaller than the main picture are displayed.

5. The PIP processing system according to claim 1, wherein the computer main body further comprises:
   a CPU, and
   a graphic card generating the video signals.

6. The PIP processing system according to claim 4, wherein the graphic card transmits R/G/B (red, green, blue) signals and H/V_sync (horizontal and vertical synchronous) signals to the monitor to display the video signals on a display part of the monitor.

7. The PIP processing system according to claim 1, wherein the micro controller controls the computer input part, the data interface, the auxiliary input part, the PIP processing part, the video processing part, and the display part.

8. The PIP processing system according to claim 1, wherein the data interface comprises a USB (universal serial bus) interface, a DDC (display data channel), or a UART (universal asynchronous receiver/transmitter) serial interface.

9. The PIP processing system according to claim 1, further comprising:
   a data interface in the monitor providing data communication between the computer main body and the monitor, wherein the micro controller transmits PIP screen data comprising the at least one of the size and the position of the PIP screen displayed on the monitor, to the computer main body through the data interface, and
   a PIP screen controller in the computer main body transmitting frame data to visually limit a display area of the PIP screen against the main screen on the monitor based on the PIP screen data.

10. A PIP processing system of a monitor coupled to a computer main body, comprising:
    a mouse coupled to the computer main body outputting a mouse signal;
    a mouse input processing part provided in the computer main body coupled to the mouse, converting the mouse signal into a PIP screen control signal to control a PIP function, and transmitting the PIP screen control signal to the monitor;
    a PIP processing part in the monitor supporting the PIP function displaying a main picture as a full screen and a PIP screen smaller than the main picture; and
    a micro controller in the monitor controlling the PIP processing part based on the PIP screen control signal transmitted from the mouse input processing part through an interface in the monitor, and adjusting at least one of a size and a position of the PIP screen,
    wherein the monitor receives video signals from the computer main body and video signals received directly at the monitor from a video signal source and outputting the video signals to the PIP processing part.

11. The PIP processing system according to claim 10, wherein the monitor further comprises:
a computer input part receiving the video signals from the computer main body, and
an auxiliary input part receiving the video signals from a video signal source, wherein the computer input part and the auxiliary input part output the video signals to the PIP processing part to display the main picture as the full screen and the PIP screen smaller than the main picture.

12. A method of controlling a PIP processing system of a monitor receiving video signals from a computer main body and video signals received directly at the monitor from another video signal source and displaying a main picture as a full screen and a PIP screen smaller than the main picture, comprising:
determining whether a mouse signal from a mouse coupled to the computer main body is inputted to adjust a PIP screen;
converting the mouse signal into a PIP screen control signal when the mouse signal is inputted to adjust the PIP screen; and
adjusting at least one of a size and a position of the PIP screen based on the PIP screen control signal received through an interface in the monitor from the computer main body.

13. The method according to claim 12, further comprising:
transmitting PIP screen data comprising at least one of size data and position data of the PIP screen from the monitor to the computer main body; and
adding a frame visually limiting a display area of the PIP screen against the main screen to the monitor based on the PIP screen data transmitted to the computer main body.

14. A method of controlling a PIP processing system of a monitor coupled to a computer main body, comprising:
receiving video signals from the computer main body and video signals received directly at the monitor from a video signal source to display a main picture and a PIP screen smaller than the main picture;
generating an input signal from a device coupled to the computer main body;
converting the input signal into a PIP screen control signal;
transmitting to the computer main body PIP screen data comprising at least one of a size and a position of a PIP screen to be displayed on the monitor;
transmitting frame data to the monitor to visually limit a display area of the PIP screen against a main screen on the monitor based on the PIP screen data; and
adjusting at least one of the position and the size of the PIP screen on the basis of the PIP screen control signal received through an interface in the monitor from the computer main body.

15. The method according to claim 14, further comprising:
storing the position, the size, and frame data of the PIP screen in the computer main body.

16. A PIP processing system of a monitor coupled to a computer main body, comprising:
a PIP processing part supporting a PIP function displaying a main picture as a full screen and a PIP screen smaller than the main picture, based on video signals output to the PIP processing unit from the monitor, the monitor having received video signals from the computer main body and video signals received directly at the monitor from a video signal source;
a micro controller transmitting to the computer main body PIP screen data comprising at least one of a size and a position of the PIP screen;
a data interface providing data communication between the computer main body and the monitor,
wherein the micro controller transmits the PIP screen data comprising at least one of the size and the position of the PIP screen displayed on the monitor, to the computer main body through the data interface.

17. The PIP processing system according to claim 16, further comprising:
a computer input part receiving video signals from the computer main body; and
an auxiliary input part receiving video signals from a video signal source,
wherein the computer input part and the auxiliary input part output the video signals to the PIP processing part to display the main picture as the full screen and the PIP screen smaller than the main picture.

18. The PIP processing system according to claim 16, further comprising:
a video processing part converting a video output signal from the PIP processing part into a signal to display the main picture and the PIP screen; and
a display part on which the main picture as the full screen and the PIP screen smaller than the main picture are displayed.

19. The PIP processing system according to claim 16, wherein the data interface comprises a Universal Serial Bus interface, a Display Data Channel, or a Universal Asynchronous Receiver/Transmitter serial interface.

20. The PIP processing system according to claim 16, wherein the PIP processing part, the micro controller, and the data interface are provided in the monitor.

* * * * *